(12) United States Patent
Brauer et al.

(10) Patent No.: US 12,308,489 B2
(45) Date of Patent: May 20, 2025

(54) METHOD FOR OPERATING A FUEL CELL SYSTEM AND CONTROL DEVICE

(71) Applicant: Robert Bosch GmbH, Stuttgart (DE)

(72) Inventors: Ingo Brauer, Vaihingen (DE); Felix Guenther, Stuttgart (DE); Michael Schmidt, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 501 days.

(21) Appl. No.: 17/772,817

(22) PCT Filed: Oct. 9, 2020

(86) PCT No.: PCT/EP2020/078353
§ 371 (c)(1),
(2) Date: Apr. 28, 2022

(87) PCT Pub. No.: WO2021/083634
PCT Pub. Date: May 6, 2021

(65) Prior Publication Data
US 2022/0376279 A1 Nov. 24, 2022

(30) Foreign Application Priority Data
Oct. 29, 2019 (DE) ...................... 10 2019 216 657.1

(51) Int. Cl.
*H01M 8/04* (2016.01)
*H01M 8/04089* (2016.01)
(Continued)

(52) U.S. Cl.
CPC ... *H01M 8/04097* (2013.01); *H01M 8/04462* (2013.01); *H01M 8/04664* (2013.01); *H01M 2250/20* (2013.01)

(58) Field of Classification Search
CPC ......... H01M 8/04097; H01M 8/04179; H01M 8/04447; H01M 8/0447
(Continued)

(56) References Cited

U.S. PATENT DOCUMENTS

| 2010/0151287 A1 | 6/2010 | Chowdhury |
| 2011/0059379 A1* | 3/2011 | Franco ................. H01M 4/926 |
| | | 429/427 |

(Continued)

FOREIGN PATENT DOCUMENTS

| CN | 101262068 A | 9/2008 |
| DE | 102005058830 A1 | 6/2007 |

(Continued)

OTHER PUBLICATIONS

Translation of International Search Report for Application No. PCT/EP2020/078353 dated Jan. 11, 2021 (2 pages).

*Primary Examiner* — James M Erwin
(74) *Attorney, Agent, or Firm* — Michael Best & Friedrich LLP

(57) ABSTRACT

The invention relates to a method for operating a fuel cell system (1), in particular a PEM fuel cell system, in which at least one fuel cell (2) is supplied with a hydrogen-containing anode gas via an anode gas path (3) and anode gas exiting the fuel cell (2) is returned via a recirculation path (4), wherein, in order to reduce a nitrogen content in the anode gas, a flush valve (5) arranged in the recirculation path (4) is opened and the recirculation path (4) is flushed. According to the invention, the actual composition of the anode gas is determined using at least one sensor (6) and the ageing status of the at least one fuel cell (2) is determined by comparing the determined actual composition with a target composition and/or an actual composition determined earlier. The inven- (Continued)

tion also relates to a control device (7) for carrying out the method according to the invention.

10 Claims, 1 Drawing Sheet

(51) Int. Cl.
*H01M 8/0444* (2016.01)
*H01M 8/04664* (2016.01)

(58) Field of Classification Search
USPC .......................................................... 429/415
See application file for complete search history.

(56) References Cited

U.S. PATENT DOCUMENTS

| | | | | |
|---|---|---|---|---|
| 2011/0300463 | A1* | 12/2011 | Reinert | H01M 8/04753 |
| | | | | 429/432 |
| 2012/0052408 | A1 | 3/2012 | Lang et al. | |
| 2016/0336610 | A1* | 11/2016 | Bach | H01M 8/04097 |
| 2019/0379074 | A1* | 12/2019 | Sinha | H01M 8/04447 |

FOREIGN PATENT DOCUMENTS

| | | |
|---|---|---|
| DE | 102005058832 A1 | 6/2007 |
| DE | 102009036197 A1 | 2/2011 |
| JP | 2003272685 A | 9/2003 |
| JP | 2005141977 A | 6/2005 |
| JP | 2005310653 A | 11/2005 |
| JP | 2006294504 A | 10/2006 |
| JP | 2010153247 A | 7/2010 |
| JP | 2019110031 A | 7/2019 |
| WO | 2008052578 A1 | 5/2008 |

* cited by examiner

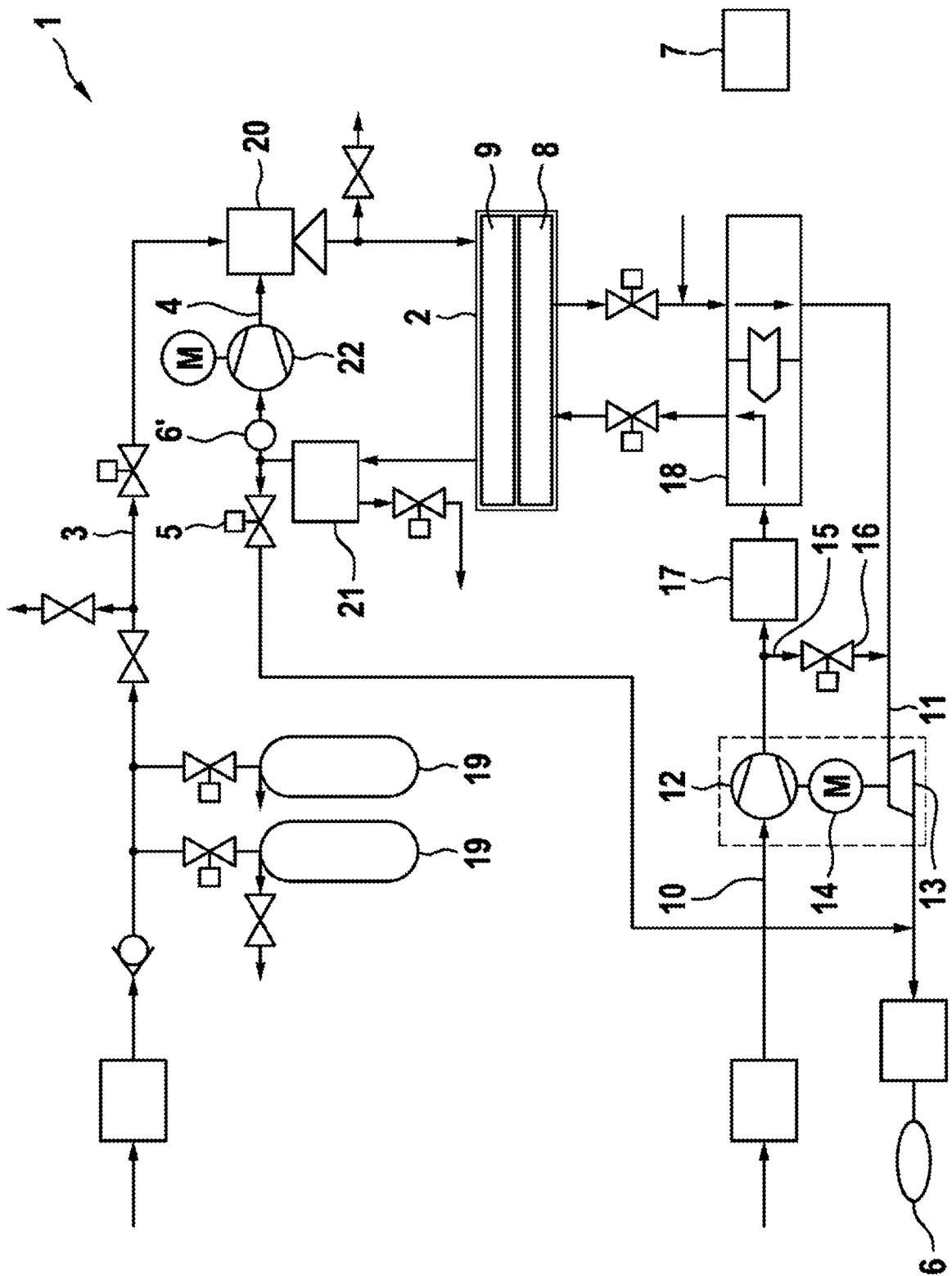

METHOD FOR OPERATING A FUEL CELL SYSTEM AND CONTROL DEVICE

BACKGROUND OF THE INVENTION

The invention concerns a method for operating a fuel cell system, in particular a PEM fuel cell system. The invention also concerns a control device which allows performance of the method according to the invention.

By means of a fuel cell system of the above-mentioned type, using hydrogen and oxygen, chemical energy can be converted into electrical energy. For this, the fuel cell system comprises at least one fuel cell with an anode, a cathode and an electrolyte arranged between the anode and the cathode. If a polymer membrane (PEM=proton exchange membrane) is used as an electrolyte, the fuel cell is described as a PEM fuel cell or a PEM fuel cell system.

Electrical energy obtained by means of a fuel cell system may be used as drive energy, for example to drive a vehicle. The required hydrogen is in this case carried in a suitable tank on board the vehicle. The oxygen also required is extracted from the ambient air.

During operation of a fuel cell system, the fuel cells age, in particular because of thinning of the membranes and/or a reduction in the efficacy of platinum coatings. The result is that the quantity of nitrogen which diffuses from the cathode side to the anode side increases over the life of the fuel cells. This changes the ratio of nitrogen to hydrogen in the anode region to the detriment of the hydrogen balance. Accordingly, the efficiency of the fuel cell system falls.

SUMMARY OF THE INVENTION

The present invention is based on the object of increasing the efficiency in operation of the fuel cell system.

To achieve this object, the method according to the invention is given. Advantageous embodiments are described in the subclaims. Furthermore, the control device according to the invention is indicated.

With the proposed method for operating a fuel cell system, in particular a PEM fuel cell system, at least one fuel cell is supplied with a hydrogen-containing anode gas via an anode gas path, and anode gas exiting the fuel cell is returned via a recirculation path. In order to reduce a nitrogen content in the anode gas, a flushing valve arranged in the recirculation path is opened and the recirculation path is flushed. According to the invention, the actual composition of the anode gas is determined by means of at least one sensor and the ageing state of the at least one fuel cell is determined by comparing the determined actual composition with a nominal composition and/or an actual composition determined at an earlier time.

The invention uses the above-mentioned correlation between the ageing of the fuel cell and the associated nitrogen enrichment of the anode gas. If the composition of the anode gas is known, conclusions about the ageing state of the fuel cell can be drawn. If it is found that the ageing state is unsatisfactory so that an efficient operation of the system is no longer possible, an exchange may be made. In this way, the efficiency of the system is increased again.

A further advantage of the proposed method is that the flushing of the recirculation path can be performed as required in knowledge of the actual composition of the anode gas. Consequently, the number of flushing processes is reduced or the flushing intervals become longer. Accordingly, also the hydrogen loss associated with each flush is reduced. In knowledge of the actual composition of the anode gas, accordingly the flushing process can be optimized at the same time, which leads to further efficiency gains.

In order to determine the actual composition of the anode gas, preferably a defined operating point is reached. In this way, it is ensured that the determined values are comparable. The operating point to be reached may for example be defined by the system power, the pressure level and/or the gas mass flow in the anode and/or cathode region.

The actual composition determined in this way can be compared with a nominal composition and/or an actual composition which was determined at an earlier time also using the method according to the invention. The actual compositions determined using the method during operation of the fuel cell system are therefore preferably stored in a data memory and made available to an analysis device. The same applies to a nominal composition which is used for comparison with the determined actual composition.

With the proposed method, preferably the hydrogen content of the anode gas is determined by means of the sensor. The nitrogen content can be determined from the hydrogen content, and the ageing state of the at least one fuel cell can in turn be derived from the nitrogen content. Thus in principle it is sufficient to determine solely the hydrogen content in order to determine the actual composition. The sensor used in the method is therefore preferably a hydrogen sensor. Such sensors have been known from the prior art for a long time. As an example, reference is made to publications DE 10 2005 058 830 A1 and DE 10 2005 058 832 A1, which are previous applications by the same applicant.

It is furthermore proposed that the actual composition of the anode gas present in the recirculation path is determined by means of the sensor. This means that to determine the actual composition of the anode gas, a sensor is used which is arranged in the recirculation path.

Alternatively or additionally, it is proposed that the actual composition of the anode gas discharged via the flushing valve is determined by means of the sensor. In this case, the sensor or a sensor is arranged after the flushing valve and therefore outside the anode region. The sensor may for example be arranged in a cathode outlet gas path, via which the flushing quantity together with the cathode outlet gas is removed from the system. Since usually a sensor for determining a gas composition is already present in the cathode outlet gas path, in some cases this sensor may be used for determining the hydrogen content, so that performance of the method does not require any additional sensors.

Advantageously, the ageing state of the at least one fuel cell is determined at regular temporal intervals. In this way, it is possible to react to a change in the actual composition of the anode gas or an ageing of the at least one fuel cell in good time.

In a refinement of the invention, it is proposed that when monitoring the ageing state of the at least one fuel cell, the ageing state of the flushing valve and/or the sensor is also taken into account. In this way, the accuracy of determination of the ageing state of the at least one fuel cell can be increased.

To determine the ageing state of the flushing valve and/or the sensor, the hydrogen content of the anode gas discharged via the flushing valve in a defined state A is compared with the hydrogen content in a defined state B. This means that the operating state is changed, or two different operating points are reached and compared. A change in gas composition can then be attributed to a modified function of a component used in the determination of the hydrogen content.

State A is preferably achieved in load-free state of the fuel cell system by lowering the pressure on the cathode side relative to the anode side. This prevents nitrogen from the cathode side diffusing onto the anode side. In addition, the flushing valve can be opened and the anode region flushed.

State B is preferably achieved in normal operation of the fuel cell system by reaching a defined load point.

Preferably, the hydrogen content in state A and in state B is determined at the time of commissioning of the system and stored as a reference. The two operating points may then be measured again at a later time.

Since state A can be set independently of the ageing state of the at least one fuel cell, by comparison of the measurements performed in both operating states, a conclusion may be drawn about the nitrogen quantity which diffuses via the membrane from the cathode side to the anode side.

Furthermore, a control device is proposed which is configured to carry out the method according to the invention as described above. By means of the control device, in particular the sensor data of the sensor used in the method can be analyzed. Furthermore, the result of the analysis and/or a reference may be stored in the control device so that the comparisons necessary for performance of the method become possible. In particular, a nominal composition and/or earlier actual composition may be stored in the control device. For this, the control device preferably comprises a data memory. At the same time, the control device may comprise an analysis device in order to allow the necessary analysis of the sensor data. Furthermore, the control device may be connected to the flushing valve via a control line in order to actuate or open the flushing valve, and hence flush the recirculation path, depending on the result of the analysis.

BRIEF DESCRIPTION OF THE DRAWINGS

The invention is described in more detail below with reference to the appended drawing. This shows a schematic illustration of a fuel cell system according to the invention.

DETAILED DESCRIPTION

The fuel cell system 1 illustrated schematically in the drawing serves to drive a vehicle. It constitutes merely one possible exemplary embodiment of a fuel cell system for performance of the method according to the invention.

The fuel cell system comprises at least one fuel cell 2 or several fuel cells 2 in a stacked arrangement. Air as a cathode gas is supplied to a cathode 8 of the fuel cell system 1 via a cathode gas path 10, while hydrogen as an anode gas is supplied to an anode 9 of the fuel cell system 1 via an anode gas path 3.

The air supplied to the cathode 8 is taken from the environment. Firstly, the air is compressed by means of a compressor 12 arranged in the cathode gas path 10. After compression, the air is cooled again via a cooling device 17 (also arranged in the cathode gas path 10) and is additionally moistened by means of a downstream moistening device 18. The compressor 12, the cooling device 17 and/or the moistening device 18 are optional. Cathode outlet gas exiting from the at least one fuel cell 2 is discharged via a cathode outlet gas path 11. The cathode outlet gas is supplied to an outlet gas turbine 13, which is arranged in the cathode outlet gas path 11 and supports an electric motor 14 for driving the compressor 12 arranged in the cathode gas path 10. The outlet gas turbine 13 is also optional. The cathode gas path 10 and the cathode outlet gas path 11 in the present case can be connected together via a bypass path 15 depending on the switch position of a bypass valve 16.

The hydrogen serving as an anode gas is stored in tanks 19 and supplied to the anode 9 by means of a suction jet pump 20 arranged in the anode gas path 3. Anode gas which exits from the at least one fuel cell 2 again is returned to the anode gas path 3 via a recirculation path 4 so it is not lost to the system. For this, a recirculation fan 22 is arranged in the recirculation path 4, but this is not however absolutely necessary.

Since the anode gas becomes enriched over time with nitrogen which diffuses from the cathode region to the anode region, from time to time the recirculation path 4 must be flushed. For this, a flushing valve 5 is arranged in the recirculation path 4 upstream of the recirculation fan 22. Liquid water contained in the anode gas can firstly be removed by means of a water separator 21 arranged in the recirculation path 4 upstream of the flushing valve 5.

The quantity of nitrogen which diffuses from the cathode region to the anode region is dependent on the ageing state of the at least one fuel cell 2, so that over time, i.e. as the age of the fuel cell 2 increases, the nitrogen proportion of the anode gas also rises, to the detriment of the hydrogen content. As a result, the efficiency of the fuel cell 2 falls.

To prevent this, according to the invention, the ageing state of the fuel cell 2 is determined from the composition of the anode gas. When necessary, the fuel cell 2 can be exchanged. Also, the recirculation path 4 is flushed depending on the ageing state of the at least one fuel cell 2. This means that flushing takes place not—as usual—at model-based temporal intervals, but as required. This extends the flushing intervals and increases the efficiency of the system.

The ageing state of the at least one fuel cell 2 is determined by comparing the actual composition, i.e. the currently determined anode gas composition, with a nominal composition. If the comparison shows a change in composition, from this an ageing or the ageing state of the at least one fuel cell 2 can be concluded. To determine the actual composition, a defined operating point is reached so that comparability is guaranteed. Then the actual composition is determined by means of the sensor 6, which in the present case is arranged in the cathode outlet gas path 11. Comparison of the actual composition with the nominal composition is carried out by means of a control device 7 in which the nominal composition is stored as a reference.

As an alternative to the arrangement of the sensor 6 illustrated in the FIG., the sensor (sensor 6') may also be placed directly in the recirculation path 4.

The invention claimed is:

1. A method for operating a fuel cell system (1), that includes at least one fuel cell, the method comprising:
   supplying the at least one fuel cell (2) with a hydrogen-containing anode gas via an anode gas path (3),
   returning the anode gas exiting the fuel cell (2) via a recirculation path (4), wherein, to reduce a nitrogen content in the anode gas, a flushing valve (5) arranged in the recirculation path (4) is opened and the recirculation path (4) is flushed, wherein a composition of the anode gas is determined by means of at least one sensor (6), and
   determining an ageing state of the at least one fuel cell (2) by comparing the determined actual composition with a nominal composition and/or an actual composition determined at an earlier time.

2. The method as claimed in claim 1, wherein a defined operating point is reached in order to determine the actual composition of the anode gas.

3. The method as claimed in claim 1, wherein the hydrogen content of the anode gas is determined by means of the sensor (6), the nitrogen content is determined from the hydrogen content, and the ageing state of the at least one fuel cell (2) is derived from the nitrogen content.

4. The method as claimed in claim 1, wherein the actual composition of the anode gas present in the recirculation path (4) is determined by means of the sensor (6).

5. The method as claimed in claim 1, wherein the actual composition of the anode gas discharged via the flushing valve (4) is determined by means of the sensor (6).

6. The method as in claim 1, wherein the ageing state of the at least one fuel cell (2) is determined at regular temporal intervals.

7. The method as claimed in claim 1, wherein the ageing state of the flushing valve (5) and/or the sensor (6) is taken into account and, to determine the ageing state of the flushing valve (5) and/or the sensor (6), the hydrogen content of the anode gas discharged via the flushing valve (5) in a defined state A is compared with the hydrogen content in a defined state B.

8. The method as claimed in claim 7, wherein state A is achieved in load-free state of the fuel cell system (1) by lowering the pressure on the cathode side relative to the anode side.

9. The method as claimed in claim 7 wherein state B is achieved in normal operation of the fuel cell system (1) by reaching a defined load point.

10. A control device (7) which is configured to carry out the method as claimed in claim 1.

* * * * *